United States Patent
Strange et al.

(10) Patent No.: US 6,299,752 B1
(45) Date of Patent: Oct. 9, 2001

(54) VERY HIGH VOLT OXIDE FORMATION OF ALUMINUM FOR ELECTROLYTIC CAPACITORS

(75) Inventors: Thomas F. Strange, Easley; Timothy R. Marshall, Pickens, both of SC (US)

(73) Assignee: Pacesetter, Inc., Sunnyvale, CA (US)

( * ) Notice: Subject to any disclaimer, the term of this patent is extended or adjusted under 35 U.S.C. 154(b) by 0 days.

(21) Appl. No.: 09/266,250

(22) Filed: Mar. 10, 1999

(51) Int. Cl.$^7$ ................................................. C25D 11/12
(52) U.S. Cl. .................... 205/152; 205/153; 205/171; 205/175; 205/213; 205/223; 205/229; 205/332
(58) Field of Search ............................ 205/152, 153, 205/171, 175, 213, 220, 223, 229, 322, 324, 332

(56) References Cited

U.S. PATENT DOCUMENTS

| | | | |
|---|---|---|---|
| 3,767,541 | * 10/1973 | Curtis | 204/56 R |
| 4,582,574 | * 4/1986 | Nguyen et al. | 204/27 |
| 5,143,591 | * 9/1992 | Shaffer | 205/50 |
| 5,449,448 | * 9/1995 | Kurihara et al. | 205/153 |
| 6,096,184 | * 8/2000 | Yoshida et al. | 205/153 |

OTHER PUBLICATIONS

F.A. Lowenheim, Electroplating, McGraw–Hill Book Co., New York, pp 99, No month available 1978.*

* cited by examiner

Primary Examiner—Kathryn Gorgos
Assistant Examiner—William T. Leader
(74) Attorney, Agent, or Firm—Steven M. Mitchell

(57) ABSTRACT

An anode foil treatment method produces a useful high quality oxide with inherently high capacitance at voltages as high as 750 Volts or more. The anode foil treatment method comprises a series of formation and relaxation steps. Oxide layer formation is performed in a forming mixture that includes a high molecular weight dicarboxylic acid that is made into a salt and a strong base. The concentration of the dicarboxylic acid is carefully monitored and kept within a narrow band. The complex by-product of the dicarboxylic salt created during formation process is kept below a fixed maximum level.

34 Claims, 4 Drawing Sheets

VERY HIGH VOLT OXIDE FORMATION OF ALUMINUM FOR ELECTROLYTIC CAPACITORS

BACKGROUND OF THE INVENTION

1. Field of the Invention

This invention relates generally to a treatment process for anode foils to be used in electrolytic capacitors. This invention also relates to a high capacitance anode foil capable of supporting voltages in excess of 750 Volts created by the foil treatment process, an electrolytic capacitor incorporating this anode foil, and an implantable Cardioverter Defibrillator (ICD) incorporating this electrolytic capacitor.

2. Related Art

Compact, high voltage capacitors are utilized as energy storage reservoirs in many applications, including implantable medical devices. These capacitors are required to have a high energy density since it is desirable to minimize the overall size of the implanted device. This is particularly true of an Implantable Cardioverter Defibrillator (ICD), also referred to as an implantable defibrillator, since the high voltage capacitors used to deliver the defibrillation pulse can occupy as much as one third of the ICD volume.

An ICD system normally includes control electronics, a high current electrical battery cell, an energy storage reservoir (i.e., charge capacitor(s)), and a step-up transformer and power conversion circuitry to charge the capacitor(s). Typically, the ICD charges the charge capacitor(s) to a high voltage (700–800 Volts).

Electrolytic capacitors are used in ICDs because they have the most nearly ideal properties in terms of size, reliability and ability to withstand relatively high voltage. Typically, these capacitors can be aluminum electrolytic capacitors (either rolled or flat).

Aluminum electrolytic capacitors having aluminum foil plates rolled into a very small volume are generally used in ICDs. However, flat, layered capacitors have recently been developed for use in ICDs. By etching the surface of the aluminum anode foil, the surface area can be further increased such that the capacitance increases accordingly.

Since these capacitors must typically store approximately 30–40 joules, their size can be relatively large, and it is difficult to package them in a small implantable device. Some patients who have a device implanted may be bothered by the presence of the large object in their pectoral region. Furthermore, the generally rectangular shape of some prior art devices can in some instances lead to pocket erosion at the somewhat curved corners of the device. For the comfort of the patient, it is desirable to be able to make smaller and more rounded ICDs. The size and configuration of the capacitors is a major factor in achieving this goal.

In ICDs, as in other applications where space is a critical design element, it is desirable to use capacitors with the greatest possible capacitance per unit volume. As mentioned above, one way to increase capacitance per unit area in a flat capacitor is to etch the surface of the anode foil perpendicular to the surface thereof. An ICD with flat geometry electrolytic capacitors is described in U.S. Pat. No. 5,131,388 to Pless et al. ("the Pless patent"), which is incorporated herein by reference in its entirety. While such flat capacitors provide an improvement from a packaging and energy density standpoint, the energy or power density can still be greatly improved.

Conventionally, ICDs use two capacitors in series to achieve the desired high voltage for shock delivery. From the standpoint of size, it would be desirable to provide a capacitor arrangement for an ICD in a single package rather than two capacitors in series. However, this has not been possible since available anode foil technology has limited photo flash capacitor voltages to 400V or less.

It is important that the anode foil used in these capacitors maintains a high capacitance while at the same time has a reduced leakage current. The term "leakage current" refers to the current passing between an electrolyte and an anode foil. Under conventional anode foil preparation techniques, a barrier oxide layer is formed onto one or both surfaces of a metal foil by placing the foil into an electrolyte bath and applying a positive voltage to the metal foil and a negative voltage to the electrolyte. This formation process (also referred to as electrolysis) oxidizes the surface of the metal foil. The oxide film formed during formation normally has a thickness ranging from 0.006 to 1.0 micrometers ($\mu$m). However, the oxide film must be sufficiently thick to support the intended use voltage. This oxide film acts as a dielectric layer for the capacitor, a barrier to the flow of current between the electrolyte and the metal foil, thereby providing a high resistance to leakage current passing between the anode and cathode foils. However, a small amount of current, the leakage current, still passes through the barrier oxide layer. A high leakage current can result in the poor performance and reliability of an electrolytic capacitor. In particular, a high leakage current results in greater amount of charge leaking out of the capacitor once it has been charged.

Various attempts have been made to reduce the leakage current properties of oxides formed on anode foils. For example, in a conventional anode foil formation process, such as described in U.S. Pat. No. 5,449,448 issued to Kurihara et aL (incorporated herein by reference), a hydration dip is utilized, where the aluminum foil is placed in a bath of heated pure water, followed by an organic acid "dip." Next, the barrier layer oxide is formed during electrolysis. The introduction of the organic acid dip into the formation process results in a reduced leakage current of the anode foil. However, the combination of the hydration dip and the organic acid dip also results in a reduced capacitance of the anode foil by as much as 7% or more.

During a hydration dip, a hydrated film or "hydrate layer" is formed on the surface of the aluminum foil as a result of the chemical reaction between the aluminum surface and the water at elevated temperatures. Briefly, during this chemical reaction, the oxygen in the water is stripped away from its hydrogen and bonds with the aluminum. As a result, the hydrogen is released and a crystalline aluminum oxide is formed on the surface of the aluminum. This crystalline structure is also referred to as Bohmite or pseudo-Bohmite.

On a microscopic level, the hydrate layer comprises two distinctly different layers, a dense layer (which is desired) and a more diffuse layer (which is not desired). The dense layer has a compact, crystalline structure. During electrolysis, this compact, crystalline oxide (i.e., dense) layer is incorporated in the barrier oxide layer in a smooth, homogeneous fashion such that when the barrier oxide layer is formed, it also has a compact or dense structure. Thus, the hydration step helps ensure that a desirable type of oxide is propagated during electrolysis.

In order to achieve the most optimum type of anode foil, the goal is to make the dense layer as thick as possible. Over time, the reaction rate of the aluminum with heated water falls exponentially so that after several hours, for example, the reaction rate falls to near zero. At this point in time, all of the available aluminum near the surface has chemically reacted with the hot water. However, by increasing the thickness of the hydrate layer, the thickness of an undesirable diffuse layer is also increased, while the thickness of the desirable dense layer remains largely unchanged.

The diffuse layer does not have a compact structure, though it is crystalline in nature. After a hydration step, as shown in FIG. 1A, diffuse layer 102 resembles acicular needles of aluminum oxide. Although the diffuse layer is also incorporated into the barrier layer, the result is a less dense and well ordered oxide with more interstitial vacancies and dislocations. In practice, after a formation step, and as depicted in FIG. 1B, after a dense layer 110 has reached its maximum thickness, there remains a substantial amount of the diffuse layer 112 projecting above barrier layer 111 that should be removed.

With respect to anode foil applications, the main problem with the unconverted diffuse layer is that it does not contribute much, if anything, to the amount of voltage an anode foil can withstand. Further, the diffuse layer negatively affects realizing ideal capacitance. By way of simple analogy, the diffuse layer acts to increase the distance between the anode (aluminum foil) and the cathode (the electrolyte), thereby decreasing the capacitance. It would be acceptable if the increase in distance also resulted in an increase in the amount of voltage that could be supported by the capacitor. But with a thick diffuse layer, there is little increase in the amount of voltage that the capacitor foil can support.

As mentioned above, some conventional foil treatment processes utilize the combination of the hydration dip followed by an organic acid dip in a foil treatment process. The organic acid dip serves to improve oxygen transport to both the dense and diffuse layers, resulting in a thicker hydrate layer for the same amount of time the foil is treated in a heated water bath. It is the ability to increase the dense layer thickness that is of primary importance. However, this combination of steps leads to a reduction in the capacitance of the foil. This unacceptable capacitance loss is likely due to excess thickness of the hydrate layer (i.e., the diffuse layer) that swells as a result of adsorbed organic acid from the organic acid dip. The excess diffuse layer formed as a result of the hydration step and organic acid dip is more easily dissolved than the true barrier oxide layer.

Manufacturers of electrolytic capacitors of very high capacitance, high voltage and small size have had great difficulty producing anode foils utilized in these capacitors that can support voltages of about 750 Volts or more. Conventional descriptions of commercial formation methods for electrolytic capacitors do not describe the formation of a high quality oxide with improved capacitance at voltages in excess of 750 volts. For example, U.S. Pat. No. 5,143,591 to Shaffer describes a method of producing ultra stable aluminum oxide for electrolytic capacitors. However, capacitors produced according to this method are capable of operating at voltages of less than 400 Volts. Thus, what is needed is a method of treating anode foils to produce a high quality oxide with reduced leakage current and improved capacitance at voltages exceeding 750 Volts.

SUMMARY OF THE INVENTION

The present invention generally relates to a method for the formation of a high quality oxide on an anode foil, with an inherently low leakage current and optimum capacitance at voltages greater than 750 volts, and as high as 1000 volts and more. According to the present invention, the anode foil treatment process comprises a series of formation and relaxation steps. These oxide layer formation steps are performed in formation mixture having a high molecular weight dicarboxylic acid, in its salt form, along with a strong base. The concentration levels of the formation mixture are carefully kept within a narrow band and the complex byproduct of the dicarboxylic salt created during the formation process is carefully kept below a fixed maximum level.

According to one embodiment of the present invention, a method of treating an anode foil comprises hydrating a metallic foil (preferably etched aluminum) in a bath of deionized water at elevated temperatures. The hydrated foil is placed in a first forming solution and a first voltage is applied to the foil to form a barrier oxide layer on a surface of the foil. The first voltage is between 800 Volts and 1000 Volts. Preferably, the first forming solution contains a mixture of one or more salts of a high molecular weight dicarboxylic acid (having five or more carbons) and a base. The foil is then removed from the first forming solution upon reaching a predetermined exit current (or bleed current). Complex by-products created during the formation step are then removed. Preferably, the complex by-product of the dicarboxylic salt created during formation process is kept below a fixed maximum level. The foil is then heat treated at a very high temperature. After the heat treatment, the foil is placed in a second forming solution and a second voltage is applied to the foil to reform the oxide layer. Preferably, the foil is soaked in the second forming solution for a duration of from about 1 minute to about 10 minutes before the second voltage is applied. The second voltage is between 800 Volts and 1000 Volts. Next, in a preferred embodiment, the foil is dipped in a bath of a low concentration oxide dissolving acid composition. Finally, the oxide layer of the foil is reformed on the surface of the foil in a third forming solution and at a third voltage greater than 800 Volts. As a result, an anode foil is produced having a capacitance of greater than about 0.29 microfarads per square centimeter, and capable of supporting voltages of greater than about 750 Volts. Thus, the anode foil can be improved by the use of an oxide dissolving acid dip in combination with the hydration and organic acid dips, to form a superior anode foil compared to the use of just the organic acid dip alone. Specifically, the use of an oxide dissolving acid dip removes the undesirable diffuse hydrate layer without significantly affecting the dense hydrate layer that is incorporated into the barrier oxide layer as a result of electrolysis.

According to a second embodiment of the present invention, the first formation is broken up into a series of formation steps at graduated (increasing) voltage levels. By-products created during formation are removed by a series of rinse steps performed after each of the initial formation steps. Further, according to a preferred embodiment, each subsequent reform step can also be broken up into two or more steps, at graduated (increasing) voltage levels.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

1. Overview and Discussion of the Invention

The present invention is directed toward a foil treatment process, wherein a high quality oxide is formed on a metal foil (also referred to as an anode foil) to be used in an electrolytic capacitor. This invention is also directed to a high capacitance anode foil created by the foil treatment process, an electrolytic capacitor incorporating this improved anode foil, and an Implantable Cardioverter Defibrillator (ICD) incorporating this electrolytic capacitor. In particular, anode foils prepared and treated according to the present invention can be incorporated in a high voltage (greater than 750 Volts) electrolytic capacitor that exhibits a low leakage current and a high capacitance.

The production of an anode foil capable of supporting voltages greater than 750 Volts allows a single high volt electrolytic capacitor to replace a conventional two capacitors-in-series arrangement. Having a single high voltage capacitor results in savings in cost and in space required, especially where internal volume is at a premium, such as in an ICD and related medical implant devices.

The method of the present invention produces an anode foil having a high quality oxide with inherently low leakage current and optimum capacitance at voltages as high as 1000 volts and more. As discussed in detail below, a series of formation and relaxation steps are performed in an electrolytic forming mixture (or solution) comprising a dicarboxylic acid composition. Preferably, the electrolytic forming solution comprises a high molecular weight dicarboxylic acid composition that is made into a salt with a strong base. The concentration of the electrolytic forming solution is carefully kept within a narrow band. Further, complex by-product of the dicarboxylic salt created during formation process is carefully kept below a fixed maximum level.

The described process creates an oxide of a high crystalline nature, and a desirable crystalline structure, such that at the intended use voltage, the oxide has inherently low leakage current, and inherently high capacitance for the thickness of the oxide grown. This oxide is able to support voltages of 750 to 1000 volts and higher, while maintaining the described desired properties, and is therefore superior to all other known methods of forming oxide for electrolytic capacitors.

2. Foil Treatment Process For High Voltage Foils a. First Embodiment

Figure 1A:
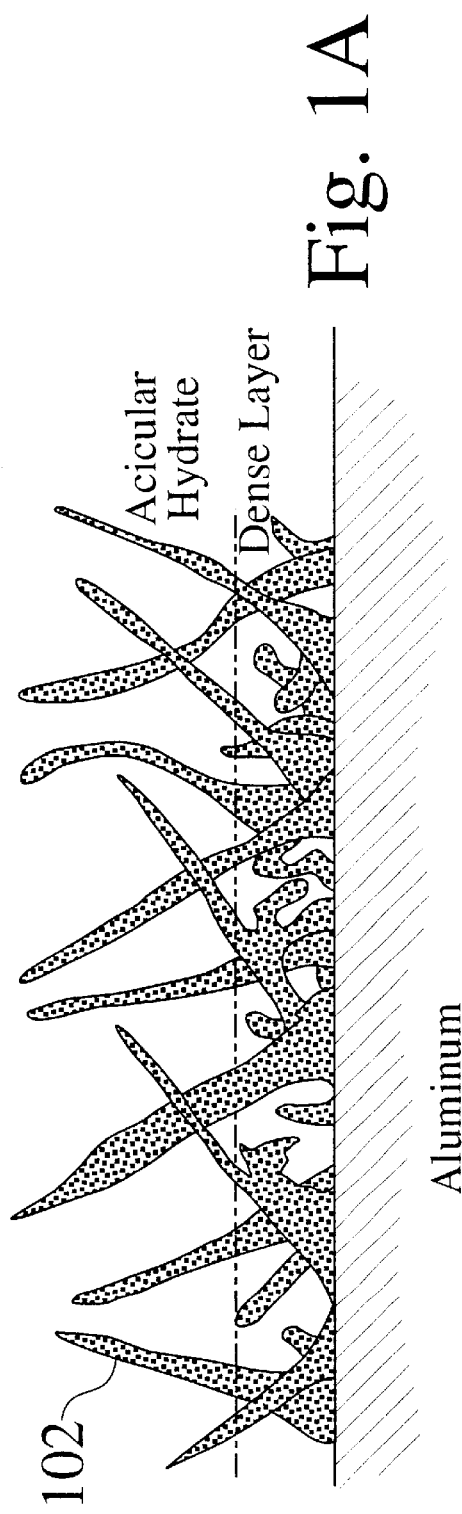
FIG. 1A depicts the formation of a hydrate layer as a result of a hydration step according to the prior art.
Figure 1B:
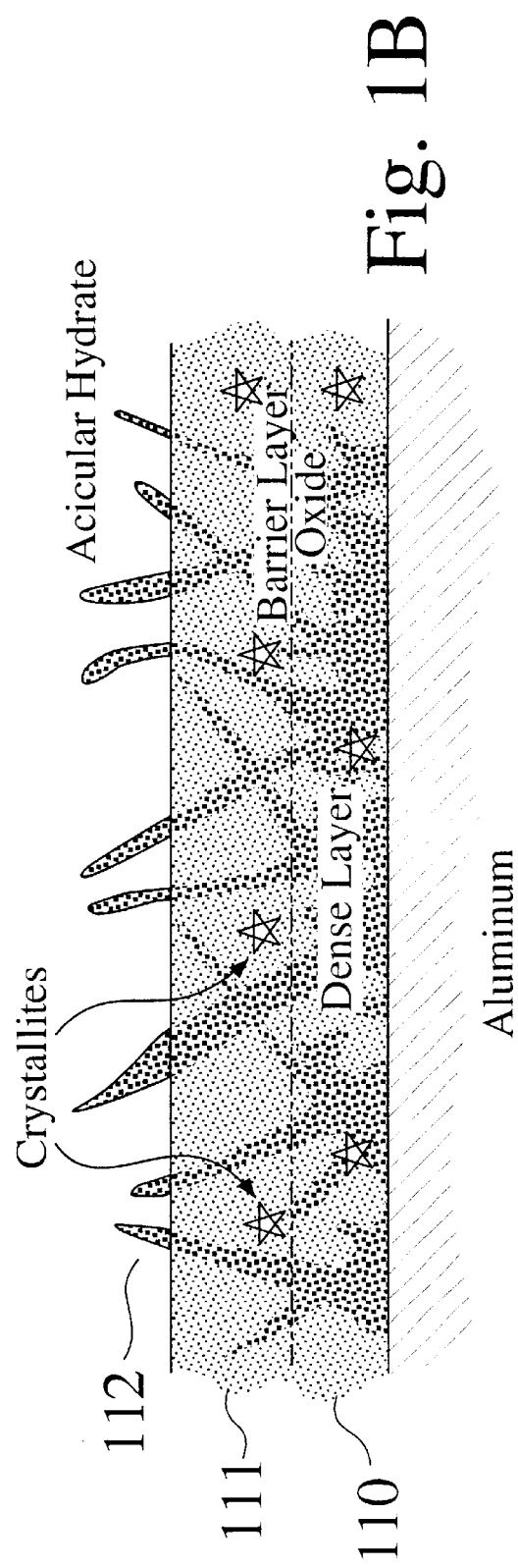
FIG. 1B depicts the formation of a hydrate layer as a result of a formation step according to the prior art.
Figure 2:
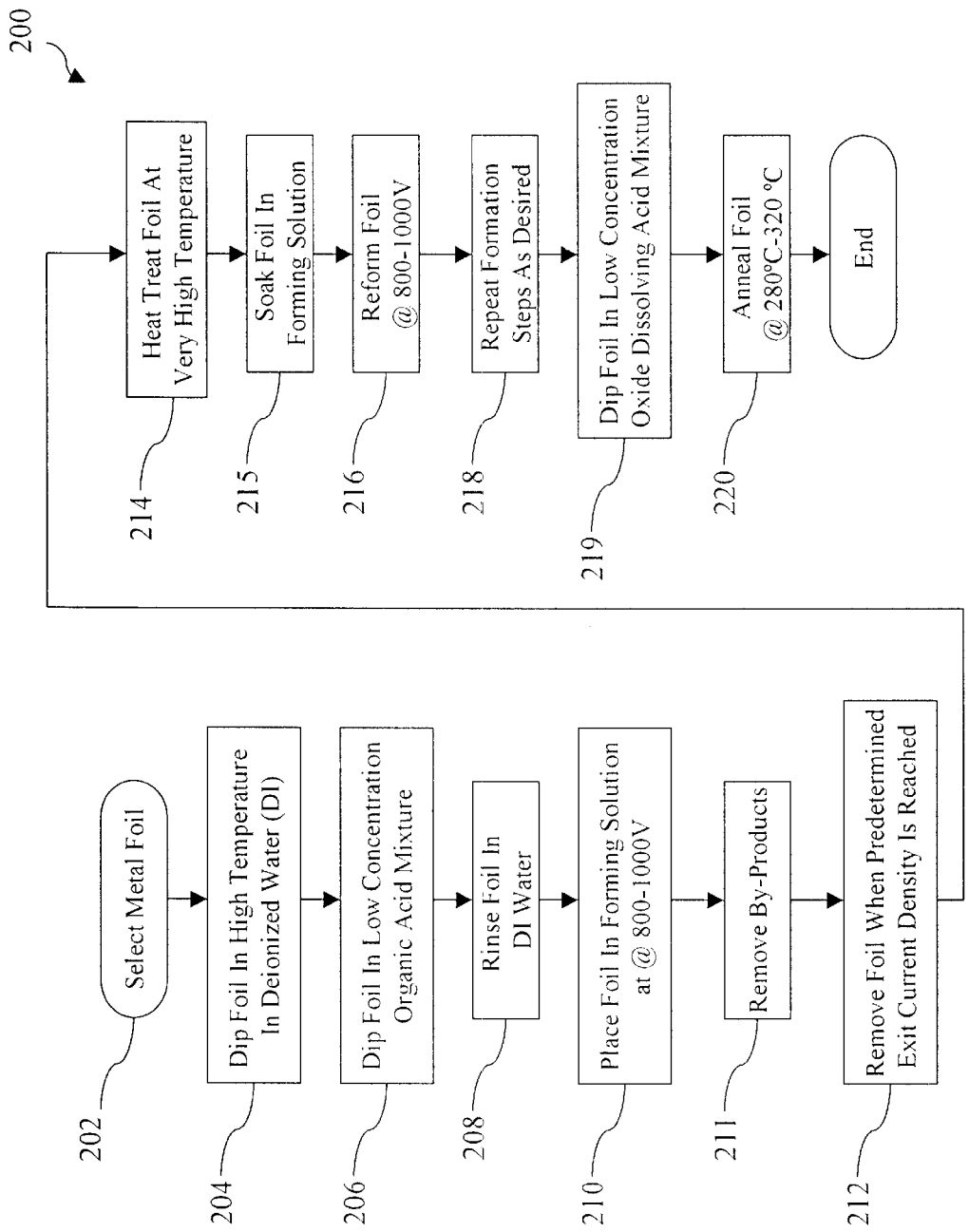
FIG. 2 is a flow-chart of an anode foil formation process according to one embodiment of the present invention.

FIG. 2 shows an anode foil formation process 200 according to one embodiment of the present invention. In step 202, an anode metal foil to be treated is selected. Aluminum foil is a preferred anode foil because of its ability to produce a sufficient quality oxide layer, its conductive properties, and its wide commercial availability. Other foils conventionally utilized in electrolytic capacitors also include tantalum, titanium, and niobium.

According to one embodiment of the present invention, either etched or non-etched aluminum foil may be utilized. In a preferred embodiment of the present invention, etched aluminum foil is utilized. Etched foil has an increased surface area. By increasing the surface area of the aluminum foil, capacitance can be increased. Aluminum foil having a thickness of about 75 to 125 microns ($\mu$m), and with a purity of at least 99.98% and a cubic texture in the (1,0,0) direction of at least 80%, is etched to produce a high surface area with an enlargement of at least 20 times over plain foil. By increasing the surface area of the aluminum, capacitance can be increased. Etching techniques are well known in the art. For example, U.S. Pat. No. 5,715,133, issued to Harrington et al. ("the Harrington patent"), describes a suitable method of etching foil and is incorporated herein by reference in its entirety. However, non-etched aluminum may also be utilized as the anode foil according to the present invention, as would be apparent to one of skill in the art.

Next, in step 204, the etched aluminum foil is hydrated. Preferably, the foil is dipped into a bath of pure (ie., deionized) water at a temperature ranging from about 80° to 100° C., with a preferred temperature of about 98° C., for a duration of about 10 to 30 minutes. The bath of deionized water should have a conductivity of about 16 megaOhms-centimeter (M$\Omega$-cm). By hydrating the foil, the "hydrate" layer (and its corresponding dense and diffuse layers) is formed on the surface of the foil to help facilitate formation of a high quality oxide layer.

In step 206, the foil can be dipped into a bath comprising an organic acid composition. According to one embodiment of the present invention, the organic acid "dip" comprises a low concentration organic acid mixture (or solution). To achieve the maximum reduction in leakage current, the organic acid in this embodiment of the present invention can be chosen from a group of dicarboxylic acids. This group includes, but is not limited to, fumaric, glutaric, malonic, malic, pimelic, succinic, adipic, sebacic, suberic, and maleic acid and salts thereof. In a preferred embodiment, the organic acid is maleic acid. According to the present invention, step 206 is optional, but preferred.

With respect to concentrations of the organic acid composition, concentrations can range from about 0.1 wt. % (percent by weight) to about 10.0 wt. % organic acid concentration. In a preferred embodiment, the organic acid dip concentration is about 0.5 wt. %. This organic acid dip is conducted at a high temperature ranging from about 70° to 95° C., and at a preferred temperature of about 85° C. The duration of the dip can be optimized to allow the improvement of the leakage current of the foil, as would be apparent to one skilled in the art. For example, dip times can range from about 30 seconds to about 20 minutes. In a preferred embodiment, the dip time is about 5 minutes.

In step 208, the foil is taken out of the organic acid mixture and rinsed in an overflow system of deionized water. According to a preferred embodiment, a thorough rinsing of the foil is helpful in reducing the likelihood of contamination of subsequent formation mixtures and solutions.

Next, a barrier oxide layer of the anode foil, that is capable of supporting voltages greater than 750 Volts, is formed on one or both surfaces of the foil in an electrolytic forming composition (also referred to as a "forming solution"). In step 210, the foil is placed in the forming solution of the present invention. In one embodiment, the forming solution contains a mixture of one or more salts of a high molecular weight dicarboxylic acid and a strong base. The preferred dicarboxylic acid constituent of the electrolytic forming solution should have five or more carbons, and can be selected from a group including, but not limited to, azelaic, suberic, sebacic, undecanedioic, dodecanedioic, and tridecanedioic acid and related organic acids and their salts. The preferred base constituent of the electrolytic forming solution can be selected from a group including, but not limited to, ammonium hydroxide, triethylamine, dimethylamine, trimethylamine, triethanolamine and related amines. As discovered by the inventors, certain conventional electrolytic forming solution compounds, such as citric acid, should be avoided because these acids break down at voltages greater than 650 Volts (boric acid, also a conventional electrolyte, does not break down at voltages greater than 650 Volts, but does decrease the potential capacitance that can be obtained).

The pH level of the electrolytic forming solution should be maintained within the pH range of about 6 to about 8. A preferred pH of the electrolytic forming solution is about 7.

According to a preferred embodiment, the concentration of the forming solution is carefully kept within a narrow band. Preferably, concentration levels of the dicarboxylic acid-strong base composition are kept very small in the electrolytic forming solution. For example, the aqueous solution of the dicarboxylic acid-strong base salt has a concentration of about 80 parts per million (ppm) to about 120 ppm, with a preferred concentration of about 100 ppm. Because of the dilute nature of the forming solution, concentration levels can be accurately measured in terms of the conductivity of the solution. The conductivity of the electrolytic forming solution ranges from about 20 to about 80 microsiemens ($\mu$S). The preferred conductivity of the electrolytic forming solution ranges from about 30 $\mu$S/cm to about 50 $\mu$S/cm. The temperature of the electrolytic forming solution ranges from about 80 degrees centigrade (° C.) to about 100° C. The preferred temperature of the electrolytic forming solution is about 88°(±2°)C.

According to the present invention, forming step 210 is performed at an applied voltage of about 800 Volts to about 1000 Volts. A conventional power supply can be utilized in step 210 to set the proper voltage and current limits for electrolysis. For example, according to a preferred embodiment, a voltage of about 990 Volts is applied to the anode foil.

According to this embodiment, the current density is maintained at about 4.0 milliamps/centimeters$^2$ (mA/cm$^2$) to about 40.0 mA/cm$^2$. In a preferred embodiment, the preferred current density is about 20 (±4) mA/cm$^2$. These current densities may be monitored during the forming step to ensure optimum oxide layer formation that is capable of withstanding voltages of 750 Volts or more.

As the inventors have discovered, during the formation process, complex high molecular weight by-products are created at the anode foil surface that can interfere with the efficient formation process, lowering the upper use formation voltage. The upper use formation voltage signifies when scintillation starts to occur. When scintillation occurs, electrons are injected into the formed oxide layer. Thus, these by-products can limit the effectiveness of the electrolytic forming solution. Empirical determinations have concluded that the byproduct level reaches detrimental levels after approximately 4000 C of current have passed per liter of forming solution with a conductivity of 40 _S/cm. Data does not exist on the exact nature and composition of the by-products.

In order to optimize the high voltage oxide layer formation process, the complex by-products are removed in step 211. According to a preferred embodiment of the present invention, the by-products can be removed by adding fresh stock solution at room temperature and overflowing the formation solution at a rate sufficient to compensate for by-product formation. The stock solution is preferably an aqueous solution comprising a small concentration of dimethylamine sebacate (DMAS).

In a preferred embodiment, the concentration of the complex by-product of the dicarboxylic salt created during formation process is kept below a fixed maximum level. As discussed above, the byproduct level reaches detrimental levels after approximately 4000 C of current has passed per liter of forming solution, at 900V Effective Formation Voltage (EFV). In a preferred embodiment, overflow can be set at a rate of 150±30 ml/min., to maintain steady state. Formation passes at 600 coulombs per second. In this embodiment, impurities occur at 10 C/sec., or 1.5 to 2.0% of the total charge passed. As the target EFV is reduced, the limiting concentration of by-product is lowered exponentially. The exact concentration of the by-product is not known, as the by-product is difficult to characterize.

The current from the power supply (or "exit" current) eventually lowers (or bleeds down) to a preset value after a duration of time. During formation, the voltage is set to a certain value and is current limited until the preset voltage is reached. Once the preset voltage is reached, the current then begins to bleed down over time (i.e., it is voltage limited). This bleed down current is also preset. Once the preset bleed down current is reached, the power supply is cut off and the foil is removed from the forming solution. If foil samples are all bled down to the same exit current and the voltage is the same as well, then the EFV should be held constant from foil to foil for multiple foil treatment runs, provided the conductivity of the forming solution is also kept constant.

Accordingly, in step 212, the barrier oxide layer continues to form in the electrolytic forming solution until a predetermined exit current density is reached. The exit current density of the foil is monitored during formation. For example, in step 212, the foil is removed from the electrolytic forming solution when the exit current density is measured to be within the range of about 0.1 mA/cm$^2$ to about 3 mA/cm$^2$. In a preferred embodiment, the foil is removed from the electrolytic forming solution when the exit current density reaches about 1.6 (±0.2) mA/cm$^2$.

After step 212 is completed, a heat treatment is applied to the foil in step 214. The heat treatment involves subjecting the foil to very high temperatures for a certain period of time. According to one embodiment, the foil can be placed in an oven or furnace at a temperature of about 480° to about 520° C. and for a duration of about 1 minute to 10 minutes. According to a preferred embodiment, the foil is placed in an oven for 4 minutes at a temperature of about 500° C.

In step 215, a foil soaking step is performed, wherein the foil is placed in a forming solution for a period of time prior to electrolysis. For example, the anode foil can be placed in a second, low concentration forming solution. The constituents of the second forming solution can be chosen from the same group of compounds that were described above with respect to step 210. In a preferred embodiment, the anode foil is returned to the same electrolytic forming solution as was used in step 210. The anode foil is allowed to soak in the second forming solution for about 1 minute to about 10 minutes, with a preferred soak time of about 2 minutes.

Next, in step 216, a second formation step (also referred to as a "reform" step) is performed in the second forming solution. Step 216 can be utilized to reform the barrier oxide layer on the surface of the anode foil. In addition, this reform step is helpful in optimizing the leakage current and capacitance characteristics of the anode foil because the oxide layer formed during the first forming step (step 210) may be slightly cracked as a result of the heat treatment of step 214. In a preferred embodiment, step 216 is performed using the same electrolytic forming solution and within the same temperature ranges as is performed in step 210.

In step 218, steps 210, 211, 212, 214, 215, and 216 (collectively referred to herein as the "formation steps") may be repeated as many times as desired to achieve the optimum oxide properties. According to one embodiment, these steps are repeated anywhere from two times to ten times. In a preferred embodiment, the formation steps are repeated four times to yield a treated anode foil having a high quality oxide layer capable of supporting voltages greater than 750 Volts.

According to the present invention, during the final repetition of the formation steps, step 215 (the foil soaking step) can be replaced by step 219. In step 219, the foil can be dipped into a bath comprising a low concentration oxide dissolving acid composition. As mentioned above, the oxide dissolving acid step is helpful in removing the undesirable diffuse layer constituent of the hydrate layer and thereby improve the leakage current characteristics of the foil. This step also acts as an additional relaxation step.

In one embodiment of the present invention, the anode foil can be dipped in a low concentration oxide dissolving acid solution. The constituents of the oxide dissolving acid solution can be selected from a group of acids including, but not limited to, phosphoric, formic, acetic, citric, oxalic, and acids of the halides. In a preferred embodiment, an aqueous solution of phosphoric acid is utilized in this step, having a concentration of about 1.0 wt. % to about 10.0 wt. %, with a preferred concentration of about 2.0 wt. %. According to a preferred embodiment, the oxide dissolving acid solution is maintained at a temperature ranging from about 60° to 100° C., with a preferred temperature of about 70° C. According to the present invention, step 219 is optional, but preferred.

In practice, it is observed that the longer the foil remains in the oxide dissolving solution, the greater the reduction of the excess swelling of the hydrate layer. As would be apparent to one of skill in the art, the amount of time the foil is kept in the oxide dissolving solution can be optimized. For example, according to a preferred embodiment of the present invention, the foil may be placed in the oxide dissolving solution for a duration of about 10 minutes to about 30 minutes, with a preferred time of 16 minutes.

Following step 219, the foil is reformed in similar manner as described above with respect to step 216. In step 220, the foil is annealed. According to one embodiment of the present invention, the foil is annealed by placing the treated foil in an oven at a temperature of about 280° to about 320° C. and for a duration of about 1 minute to 10 minutes. According to a preferred embodiment, the foil is placed in an oven for 6 minutes at a temperature of about 300° C. The resulting oxide layer is of a high quality with low leakage current and high inherent capacitance. Annealing lowers leakage current by 30%, giving a final leakage current of 35 $\mu$A/cm$^2$ at 80% of EFV, 90° C. in a suitable fill electrolyte after 1 hour in an open cup test.

b. Second Embodiment

As was discovered by the inventors, the quality of the barrier oxide layer formed during the formation steps can be improved by breaking up a single formation step, such as step 210 discussed above, into two or more separate formation steps performed at graduated (increasing) voltage levels. In addition, by using a rinse step, similar to step 208 discussed above, after each of the separate formation steps, the removal of by-products created during formation can be optimized.

Figure 3:
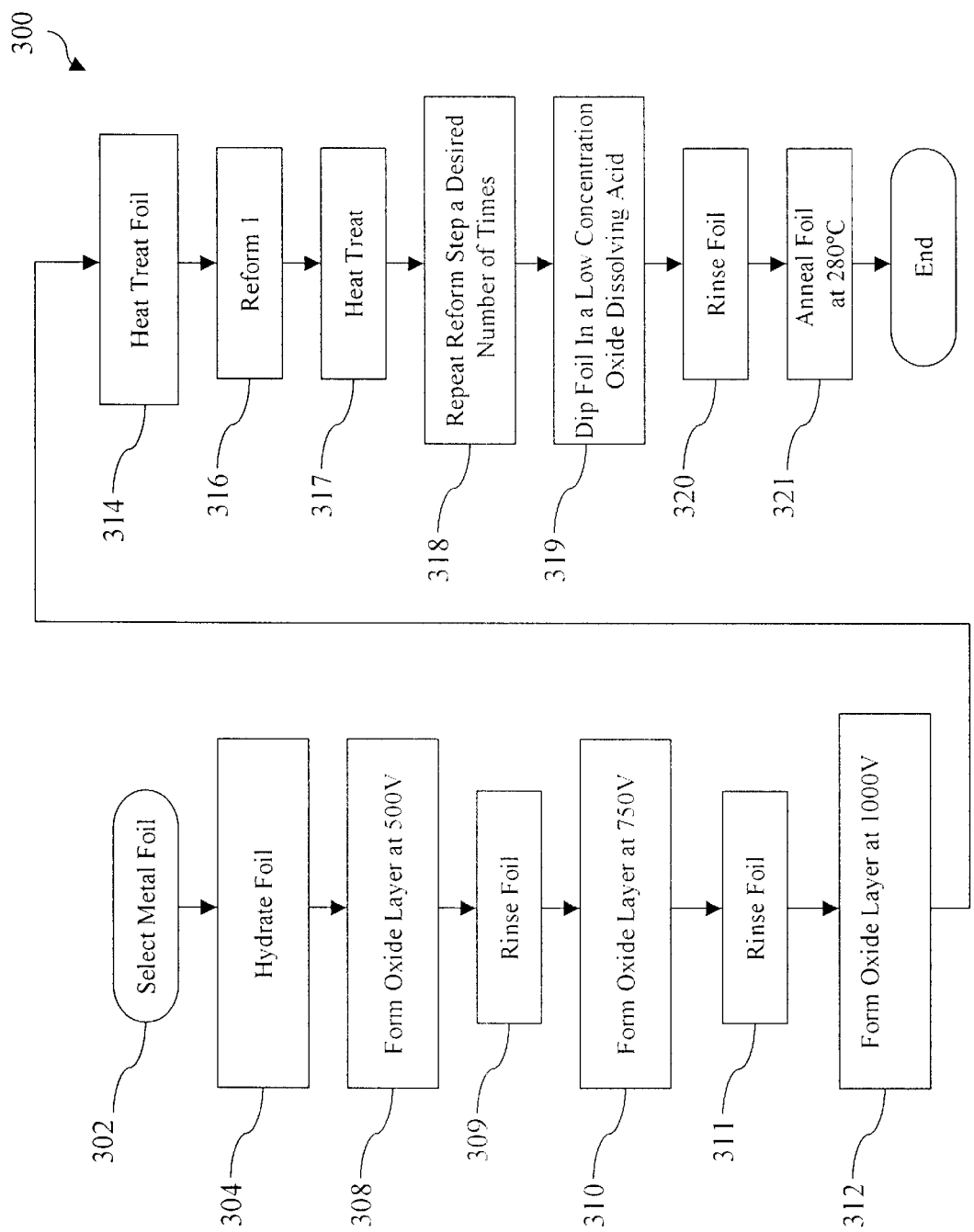
FIG. 3 is a flow-chart of an anode foil formation process according to one embodiment of the present invention.

FIG. 3 shows an anode foil formation process 300 according to a preferred embodiment of the present invention. In step 302, an anode metal foil to be treated is selected. Etched aluminum foil is a preferred anode foil because of its ability to produce a sufficient quality oxide layer, its conductive properties, and its wide commercial availability. This step is similar to step 202 described above with respect to FIG. 2.

In step 304, the aluminum foil is hydrated. Preferably, the foil is dipped into a bath of pure (ie., deionized) water at a temperature ranging from about 80° to 100° C., with a preferred temperature of about 98° C., for a duration of about 10 to 30 minutes. This step is similar to step 204 described above with respect to FIG. 2. Although not shown in FIG. 3, an organic acid dip step and a rinse step (similar to steps 206 and 208, respectively), can also be utilized in foil treatment process 300, according to a preferred embodiment.

In steps 308–312, a barrier oxide layer of the anode foil, that is capable of supporting voltages greater than 750 Volts, is formed on one or both surfaces of the foil in an electrolytic forming solution. According to this embodiment of the present invention, a single first formation step performed at a voltage of 800–1000 Volts, such as step 210, described above with respect to FIG. 2, can be broken up into two or more formation steps that are performed at graduated (increasing) voltage levels. The number of formation steps comprising this first formation, as well as the applied voltage values, can be optimized as would be apparent to one of skill in the art given the present invention.

For example, in step 308, the foil is placed in the forming solution of the present invention. As described above, the forming solution contains a mixture of one or more salts of a high molecular weight dicarboxylic acid and a strong base. The pH, concentration, and constituents of the forming solution are similar to those values and compounds described above with respect to step 210 of FIG. 2. For the formation steps where voltages of 75 Volts or less are used, the conductivity of the solution is increased to a preferred value of 100 $\mu$S/cm. For those final steps in each formation step the conductivity has to be lowered to approximately 35 $\mu$S/cm to prevent scintillation.

In step 308, the forming step is performed at an applied potential of about 450–550 Volts, with a preferred voltage of about 500 Volts in a forming solution with a preferred conductivity of 100 $\mu$S/cm. As discussed above, once the preset voltage is reached, the current then begins to bleed down over time. In this example, when the bleed current reaches about 0.4 mA/cm$^2$, the foil is removed from the forming solution.

In step 309, the foil is taken out of the forming solution and rinsed in an overflow system of deionized water. The foil can be rinsed for a period of time ranging from about 2 minutes to about 20 minutes. A preferred rinse time for this embodiment is about 5 minutes. As described above, a thorough rinsing of the foil is helpful in reducing the likelihood of contamination of subsequent formation mixtures and solutions. According to this embodiment, the rinse step is also helpful in removing complex by-products that are created during the forming step.

In step 310, the foil is returned to the forming solution with a conductivity of 100 $\mu$S/cm and the forming step is performed at an applied potential of about 700–800 Volts, with a preferred voltage of about 750 Volts. The foil undergoes electrolysis until the bleed current reaches about 0.40 mA/cm$^2$. In step 311, the foil is removed from the forming solution and is rinsed in deionized water for about 5 minutes, in a similar manner as described above for step 309.

In step 312, the foil is returned to the diluted forming solution with a conductivity of between 25 and 45 μS/cm, with a preferred conductivity of 35 μS/cm, and the forming step is performed at an applied potential of about 900–1000 Volts, with a preferred voltage of about 1000 Volts. The foil undergoes electrolysis until the bleed current reaches about 1.6 mA/cm$^2$. A further rinse step (not shown) can be performed in a manner similar to that described above for steps 309 and 311.

According to this embodiment of the present invention, a series of rinse steps after each of the above forming steps can be used in place of a by-product removal step, such as step 211, described above with respect to FIG. 2.

In step 314, a heat treatment is applied to the foil. As described above with respect to step 214, the heat treatment involves subjecting the foil to very high temperatures for a certain period of time. According to a preferred embodiment, the foil is placed in an oven for 4 minutes at a temperature of about 500° C. Although not shown in FIG. 3, a foil soaking step can be performed, wherein the foil is placed in a forming solution for a period of time prior to electrolysis. This foil soaking step is similar to that described above in step 215.

Next, in step 316, a second formation step (also referred to as a "reform" step) is performed in a second forming solution. Step 316 can be utilized to reform the barrier oxide layer on the surface of the anode foil. According to one embodiment, reform step 316 can be a single reform step, similar to step 216, described above for FIG. 2. Alternatively, reform step 316 comprises two or more formation steps performed at graduated (increasing) voltage levels.

For example, in a preferred embodiment, after undergoing heat treatment in step 314, the foil can be placed in a second forming solution. The second forming solution also contains a mixture of one or more salts of a high molecular weight dicarboxylic acid and a strong base. Preferably, the foil is placed in the same forming solution used in steps 308, 310, and 312.

In a preferred embodiment, reform step 316 is performed first at an applied potential of about 450–550 Volts, with a preferred voltage of about 500 Volts in a forming solution with a preferred conductivity of 100 μS/cm. When the bleed current reaches about 0.20 mA/cm$^2$, the foil is removed from the forming solution. After a rinsing step, the foil is returned to the second forming solution. Reform step 316 is performed next, in the diluted formation solution at a preferred conductivity of 35 μS/cm, at an applied potential of about 900–1000 Volts, with a preferred voltage of about 970 Volts. When the bleed current reaches about 1.2 mA/cm$^2$, the foil is removed from the forming solution. The voltage values and the number of formation steps utilized in step 316 can be varied as would be apparent to one of skill in the art based on the present invention. After step 316 is completed, in step 317, the foil is heat treated in a manner similar to step 314.

In step 318, the reform step may be repeated as many times as desired to achieve the optimum oxide properties. According to one embodiment, these steps are repeated anywhere from two times to ten times. In a preferred embodiment, three reform steps are utilized to yield a treated anode foil having a high quality oxide layer capable of supporting voltages greater than 750 Volts.

According to the present invention, prior to the final reform step, the foil can be dipped into a bath comprising a low concentration oxide dissolving acid composition in step 319. As mentioned above, the oxide dissolving acid step is helpful in removing the undesirable diffuse layer constituent of the hydrate layer and thereby improve the leakage current characteristics of the foil. It also acts as a relaxation step to remove defects in the oxide. The constituents of the oxide dissolving acid solution are similar to those described above with respect to step 219 of FIG. 2.

Following step 319, the foil is reformed in similar manner as described above with respect to step 316. In step 320, the foil is given a final rinse. In step 321, the foil is annealed in a manner similar to that described above with respect to step 220 of FIG. 2. The resulting oxide layer is of a high quality with high inherent capacitance and capable of supporting voltages of about 750 Volts or more.

In addition, the foils treated according to the method of the present invention exhibit excellent resistance to the effects of exposure to the fill electrolyte used in the finished electrolytic capacitor to provide the counter electrode in combination with a cathode. One example of a fill electrolyte that can be used is an ethylene glycol solution of 2.0%±0.5% Boric acid, 5.0%±2% water, and 50 ppm phosphoric acid. The mixture is thermally reacted, by a process known to those skilled in the art, and brought to a pH of 5.5 to 8.5 with anhydrous ammonia or other suitable base such as dimethylamine. The methods described above produce a useful high quality oxide with inherently low leakage current and optimum capacitance at voltages as high as 750 volts and more.

3. Examples

An investigation was conducted examining the capacitance and voltage characteristics of the foils produced according to the present invention. The experiments provided below are exemplary of the foil treatment processes described above and are not intended to limit the scope of the present invention.

The voltage measurements show that the foils produced in accordance with the formation steps described above can be incorporated into capacitors that will support voltages in excess of 750 Volts, and up to voltages of about 1000 Volts. The capacitance measurements show that a preferred foil treatment process provides a high voltage anode foil having high measured capacitance.

a. Experiment 1

A set of aluminum foils were prepared in accordance with the process described with respect to FIG. 2. The specific experimental conditions were as follows.

Forty-four etched foils, each having an area of about 254 cm$^2$, were first hydrated, then subjected to a first formation step at 990 Volts in a dilute aqueous solution of DMAS at 85° C. The concentration of the forming solution (in terms of conductivity) was about 40 μS. The foils were removed from the forming solution when the bleed current reached about 1.6 mA/cm$^2$. The foils were then heat treated at about 500° C. for a duration of 4 minutes. The foils were then soaked in the forming solution. Next, a first reform was performed at an applied voltage of about 980 Volts in the same forming solution. The foils were removed from the forming solution when the bleed current reached about 1.6 mA/cm$^2$.

After a second heat treatment at 500° C. for 4 minutes, a second reform step was performed, at an applied voltage of about 960 Volts. The foils were removed from the forming solution when the bleed current reached about 1.2 mA/cm$^2$. The foils then went into a third heat treatment at 500° C. for 4 minutes and then a third reform step was performed, at an applied voltage of 940 V. The foils were removed from the forming solution when the bleed current reached 1.0 mA/cm$^2$. Next, the foils were dipped in a low concentration oxide dissolving acid solution. The oxide dissolving acid solution contained an aqueous solution of phosphoric acid at a concentration of about 2.0 wt. %. A final reform step was performed at an applied voltage of about 920 Volts. The foils were removed from the forming solution when the bleed current reached 0.60 mA/cm$^2$. The time duration for the initial formation step was about three hours. The duration for each of the reform steps varied from about 2 minutes to about 30 minutes. Note that at the beginning of each formation step the foils are allowed to sit for 2 minutes in the formation solution before voltage is applied. Also note that after each formation (including reform) step, the foil was rinsed for about 10 minutes in an overflow bath of deionized water to remove by-products. The results are shown below in Table 1.

TABLE 1

| Grade | Number of Foils | EFV (average value) | Cap ($\mu$F) (average value) |
|---|---|---|---|
| A (EFV > 898 V) | 8 | 907.0 Volts | 77.41 $\mu$F |
| B (860 V < EFV < 898 V) | 26 | 881.8 Volts | 80.5 $\mu$F |
| C (800 V < EFV < 860 V) | 9 | 835.8 Volts | 80.4 $\mu$F |

The first column categorizes the foils into grades by Effective Formation Voltage (EFV). The second column lists the number of foils that belonged in each class. The third and fourth columns, respectively, list the average values for the EFV and Capacitance of the foils for each grade. All capacitance measurements were performed using conventional bridge equipment at a frequency of about 120 Hertz. Note that out of the 44 foils that were treated, 1 foil was discarded because of poor quality.

As these results demonstrate, utilizing the method of the first embodiment of the present invention produces anode foils with high capacitance that are capable of supporting voltages greater than 750 Volts. For example, the capacitance per square centimeters for all grades of foil, ranged from about 0.30 $\mu$F/cm$^2$ to about 0.32 pF/cm$^2$. These capacitance values represent nearly a factor of two increase over commercially available anode foils that have capacitances of about 0.15 $\mu$F/cm$^2$ to 0.17 $\mu$F/cm$^2$.

b. Experiment 2

A second set of aluminum foils (13 total) were prepared in accordance with the process described with respect to FIG. 2. These etched foils each had an area of about 270 cm$^2$. The specific experimental conditions were similar to those described above in the first experiment. The results of this trial are shown below in Table 2.

TABLE 2

| Grade | Number of Foils | EFV (average value) | Cap ($\mu$F) (average value) |
|---|---|---|---|
| A (EFV > 898 V) | 6 | 903.2 Volts | 80.65 $\mu$F |
| B (860 V < EFV < 898 V) | 7 | 897.6 Volts | 78.49 $\mu$F |

The columns listed in Table 2 are similar to those listed in Table 1. Again, the anode foils produced in this experiment exhibit high capacitance and are capable of supporting voltages greater than 750 Volts. For example, the capacitance per square centimeters for all grades of foil, ranged from about 0.29 $\mu$F/cm$^2$ to about 0.32 $\mu$F/cm$^2$.

c. Experiment 3

A third set of aluminum foils (8 total) were prepared in accordance with the process described above with respect to FIG. 3.

The etched aluminum foils each had an area of about 254 cm$^2$. After hydration, the foils were subjected to a first formation step. In this experiment, the first formation step comprised three separate formations at three graduated voltage levels, 500 Volts, 750 Volts, and 1000 Volts in a dilute aqueous solution of DMAS at 85° C. The concentration of the forming solution (in terms of conductivity) was about 100 $\mu$S/cm for the 500 and 750 V steps and approximately 35 $\mu$S/cm for the 1000 V step. The foils were removed from the forming solution when the bleed current reached about 0.40 mA/cm$^2$, 1.2 mA/cm$^2$, and 1.6 mA/cm$^2$, respectively. Separate rinse steps were performed after each of the formation steps. The foils were then heat treated at about 500° C. for a duration of 4 minutes. The foils were then soaked in the forming solution.

Next, a series of reform steps, similar to the first formation in which the formation steps were broken up into two steps, were performed. The first step consisting of a 500 V formation in 100 $\mu$S/cm solution and the second, higher voltage step in a diluted forming solution with conductivity of 35 $\mu$S/cm were performed at applied voltages of about 970 Volts (first reform), 950 Volts (second reform), and 930 Volts (third reform), in a 35 $\mu$S/cm forming solution. The foils were removed from the forming solution when the bleed current reached about 1.2 mA/cm$^2$ for the first reform, 1.0 mA/cm$^2$ for the second reform, and 0.60 mA/cm$^2$ for the final reform. The foils were dipped in an oxide dissolving acid mixture prior to the third reform step.

The experiment produced very clean foils with very little corrosion evident. The results of this experiment are shown below in Table 3.

TABLE 3

| Grade | Number of Foils | EFV (average value) | Cap ($\mu$F) (average value) |
|---|---|---|---|
| A (EFV > 898 V) | 8 | 900 Volts | 85.0 $\mu$F |

The results of this experiment show a greater improvement in the capacitance of the anode foils. The average capacitance value (per unit area) was about 0.33 $\mu$F/cm$^2$. The leakage current of the foil at 1 hour, at 80% of EFV, 90° C., using a suitable fill electrolyte in an open cup test, was 50 $\mu$A, and 35 $\mu$A for fully annealed foil tested as described, well within the range for comparable commercial foils with EFV of less than 750 volts. Thus, by breaking down at least the first formation step into a series of formations at graduated voltages, a high capacitance anode foil capable of supporting voltages of greater than 750 Volts is produced.

4. Example Implantable Cardioverter Defibrillator (ICD)

Anode foils that are processed according to the method of the present invention described above can be utilized for a variety of applications that require a metal foil having a high quality oxide layer formed on its surface. For example, anode foils are widely utilized in high voltage electrolytic capacitors. These capacitors can be very compact in size as discussed above. These capacitors can be designed and manufactured according to several known methods such as those described in the Harrington patent (referenced above). Of particular interest, are compact electrolytic capacitors designed for use in ICDs.

Figure 4:
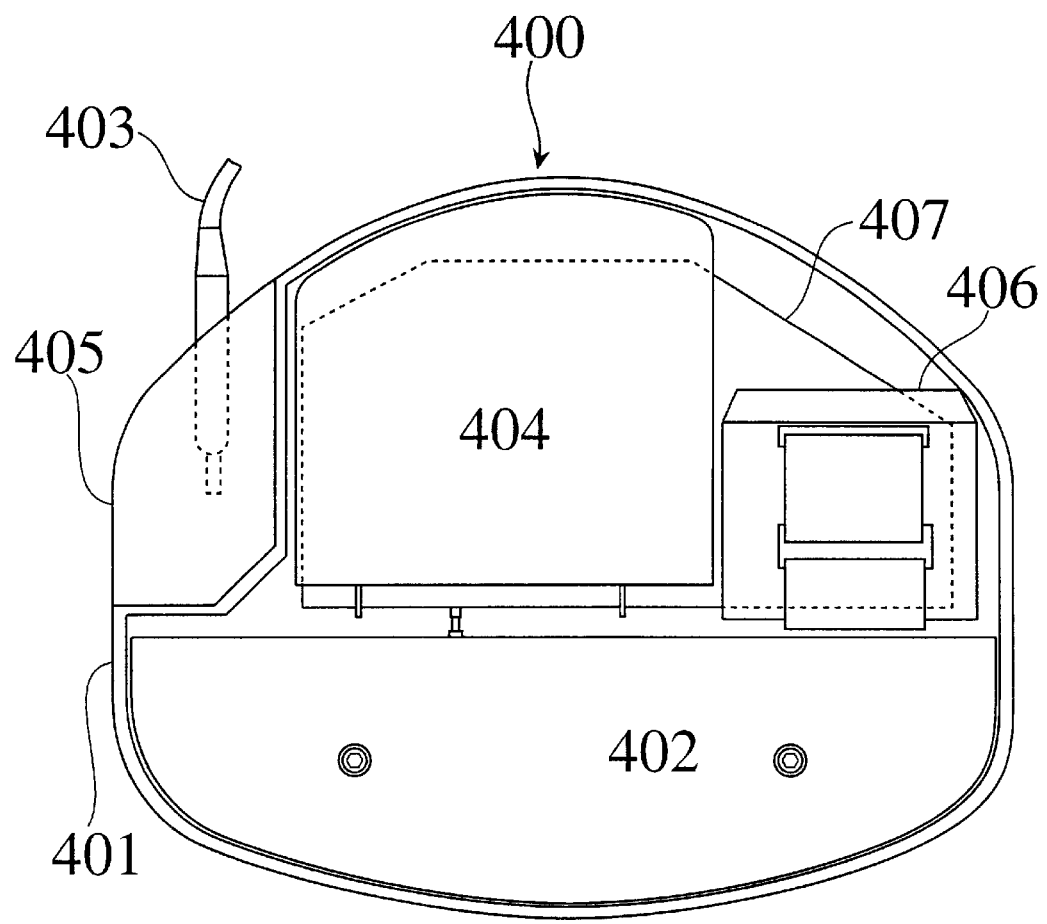
FIG. 4 depicts an Implantable Cardioverter Defibrillator (ICD) having an electrolytic capacitor incorporating the improved anode foil according to the present invention.

FIG. 4 shows a schematic diagram of an example ICD 400, similar to that described in U.S. Pat. No. 5,522,851 issued to Fayram ("the Frayam patent"; incorporated by reference herein in its entirety). ICD outer housing 401 contains a flat capacitor 402, which comprises foils treated according to the process of the present invention. Capacitor 402 can be designed to conform to the size, shape and energy requirements of ICD 400. By utilizing a high voltage capacitor according to the invention, an ICD having a single capacitor capable of storing voltages greater than 750V is possible. Capacitor 402 can be constructed as a planar layered structure of single, double, or higher multiple anode plates (i.e., anode foils produced in accordance with the process described above), or as so described in the Fayram patent.

Header 405 is used for the attachment of a lead set 403. ICD 400 also contains a battery 404 that provides electrical energy to charge capacitor 402 when needed so that it may provide a high voltage shock. ICD 400 further contains control circuitry 407 and a power transformer 406 that is used in the charging of capacitor 402. Control circuitry 407 connects to a lead set so that it may sense and analyze electrical signals from the heart, and control the delivery of an appropriate therapy.

5. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents. Additionally, all patents, patent applications and publications mentioned above are incorporated by reference herein.

What is claimed is:

1. A method for treating an anode foil, comprising the steps of:
    (a) forming an oxide layer on a first surface of said foil, wherein said foil is placed in a first forming composition at an applied voltage of about 800 Volts to about 1000 Volts; and
    (b) removing by-products formed during said forming step by adding a stock solution to said first forming composition and overflowing said first forming composition at a rate sufficient to compensate for by-product formation.

2. The method of claim 1, wherein said first forming composition comprises a mixture of one or more salts of a high molecular weight dicarboxylic acid and a base.

3. The method of claim 2, wherein said dicarboxylic acid has five or more carbons.

4. The method of claim 3, wherein said dicarboxylic acid is selected from the group consisting of azelaic, suberic, sebacic, undecanedioic, dodecanedioic, and tridecanedioic acid and their salts.

5. The method of claim 3, wherein said base of said first forming composition is selected from the group consisting of ammonium hydroxide, triethylamine, dimethylamine, trimethylamine, and triethanolamine.

6. The method of claim 1, further comprising:
    (c) removing said foil from said first forming solution when a predetermined exit current density is reached.

7. The method of claim 6, wherein said predetermined exit current density is from about 0.1 milliamps per square centimeter to about 3.0 milliamps per square centimeter.

8. The method of claim 6, further comprising:
    (d) heat treating the foil.

9. The method of claim 8, wherein said heat treating step comprises heat treating the foil in an oven at a temperature of about 450° C. to about 550° C. for a time duration of about 1 minute to about 10 minutes.

10. The method of claim 8, wherein after said heat treating step is completed, the method further comprises the step of:
    (e) placing the foil in a second forming composition wherein the foil is soaked in said second forming composition for a time duration of from about 1 minute to about 10 minutes.

11. The method of claim 10, further comprising:
    (f) reforming said oxide layer on said first surface of the foil at an applied voltage of about 800 Volts to about 1000 Volts.

12. The method of claim 11, further comprising:
    repeating step (f) at least two times.

13. The method of claim 12, further comprising:
    applying a low concentration oxide dissolving acid composition to said oxide layer formed on said foil.

14. The method of claim 13, wherein said oxide dissolving acid composition comprises an aqueous solution of an oxide dissolving acid, said oxide dissolving acid selected from the group of acids consisting of phosphoric acid, formic acid, acetic acid, citric acid, oxalic acid, and acids of the halides.

15. The method of claim 14, further comprising:
    dipping the foil in a bath comprising an aqueous solution of phosphoric acid for a time duration of about 10 minutes to about 25 minutes, said phosphoric acid present in a concentration of from about 1 wt. % (percent by weight) to about 10 wt. %, and said phosphoric acid solution having a temperature of from about 60° C. to about 90° C.

16. The method of claim 1, wherein step (a) comprises:
    (i) hydrating the foil; and
    (ii) placing the foil in a first forming composition and applying a voltage of about 800 Volts to about 1000 Volts to form an oxide layer on said first surface of the foil.

17. The method of claim 16, wherein prior to said placing step (ii), the method further comprises:
    dipping the foil into a bath of a low concentration organic acid composition.

18. The method of claim 17, wherein said dipping step comprises dipping said foil in a bath of a low concentration organic acid composition containing an aqueous solution of a low concentration of dicarboxylic acid or salt thereof at a temperature of from about 70° C. to about 95° C., for a time duration of about 30 seconds to about 20 minutes.

19. The method of claim 18, wherein said organic acid composition is selected from the group consisting of fumaric acid, glutaric acid, malonic acid, malic acid, pimelic acid, succinic acid, adipic acid, sebacic acid, suberic acid, and maleic acid and salts thereof.

20. The method of claim 1, wherein said step (a) comprises:
    forming an oxide layer on a first surface of said foil by placing said foil in a first forming composition and applying a first voltage;
    removing said foil from said first forming composition when a bleed current reaches a first preset bleed current value;
    returning said foil to said first forming composition and applying a second voltage; and
    removing said foil from said first forming composition when a bleed current reaches a second preset bleed current value, wherein said second voltage is greater than said first voltage.

21. The method of claim 20, further comprising:

returning said foil to said first forming composition and applying a third voltage; and removing said foil from said first forming composition when a bleed current reaches a third bleed current value, wherein said third voltage is greater than said second voltage and said third voltage is about 800 Volts to about 1000 Volts.

22. The method of claim 21, wherein step (b) comprises:

rinsing said foil in a bath of deionized water after each of said removing steps.

23. The method of claim 1, wherein said stock solution consists of an aqueous solution of dimethylamine sebacate (DMAS).

24. The method of claim 1, wherein a concentration of said by-products created during said forming step is kept below a fixed maximum level.

25. A method for treating an anode foil, comprising the steps of:

(a) forming an oxide layer on a first surface of said foil, wherein said foil is placed in a first forming composition at an applied voltage of about 800 Volts to about 1000 Volts;

(b) removing said foil from said first forming composition when a bleed current reaches a first preset bleed current value;

(c) returning said foil to said first forming composition at a second applied voltage, wherein said second voltage is greater than said first voltage, (d) removing said foil from said first forming composition when a bleed current reaches a second preset bleed current value; and (e) removing by-products formed during said forming step and said returning step.

26. The method of claim 25, wherein step (e) comprises:

removing by-products by adding a stock solution to said first forming composition and overflowing said first forming composition at a rate sufficient to compensate for by-product formation.

27. The method of claim 26, wherein said stock solution consists of an aqueous solution of dimethylamine sebacate (DMAS).

28. The method of claim 26, wherein a concentration of said by-products created during said forming step is kept below a fixed maximum level.

29. The method of claim 25, further comprising:

(f) returning said foil to said first forming composition and applying a third voltage; and (g) removing said foil from said first forming composition when a bleed current reaches a third bleed current value, wherein said third voltage is greater than said second voltage and said third voltage is about 800 Volts to about 1000 Volts.

30. The method of claim 25, wherein step (e) comprises:

rinsing said foil in a bath of deionized water after each of said removing steps.

31. The method of claim 25, wherein said first forming composition comprises a mixture of one or more salts of a high molecular weight dicarboxylic acid and a base.

32. The method of claim 31, wherein said dicarboxylic acid has five or more carbons.

33. The method of claim 32, wherein said dicarboxylic acid is selected from the group consisting of azelaic, suberic, sebacic, undecanedioic, dodecanedioic, and tridecanedioic acid and their salts.

34. The method of claim 31, wherein said base of said first forming composition is selected from the group consisting of ammonium hydroxide, triethylamine, dimethylamine, trimethylamine, and triethanolamine.

* * * * *